United States Patent
Guldenbalk et al.

[11] 3,883,787
[45] May 13, 1975

[54] DEVICE FOR NUMERICAL PROGRAMMED CONTROL

[76] Inventors: Alexei Pavlovich Guldenbalk, ulitsa Kalgaeva 3, kv. 19, Leningrad; Vitaly Ivanovich Ivchenko, Furmanny pereulok 7, kv. 8; Teodor Iosifovich Kazakevich, 6 Novopodmaskovny pereulok, 10, kv. 28, both of Moscow; Leonid Pavlovich Koslov, prospekt Shvernika 47, kv. 49, Leningrad; Vladimir Grigorievich Kolosov, prospekt Shvernika 47, kv. 48, Leningrad; Ninel Iosifovna Kolosova, prospekt Marisa Toreza, 40, korpus 1, kv. 152, Leningrad; Viktor Fedorovich Melekhin, prospekt Nauki, 12, Korpus 6, kv. 87, Leningrad; Leonid Semenovich Popandopulo, Lodochnaya ulitsa 29, kv. 138, Moscow; Sergei Leonidovich Chechurin, ulitsa Manchesterskaya, 12 kv. 29, Leningrad; Pavel Sergeevich Ivanov, Bulvarnaya ulitsa, 89, kv. 22, Leningrad; Vyacheslav Semenovich Korolev, ulitsa Ushinskogo, 18, kv. 111, Leningrad; Vadim Nikolaevich Kushinikov, ulitsa Sedova, 140, kv. 27, Leningrad; Vladimir Fedorovich Sokolov, ulitsa Pulkovskaya, 25, kv. 62, Moscow; Vyacheslav Anatolievich Chiganov, ulitsa Mira 21, kv. 10, Leningrad, all of U.S.S.R.

[22] Filed: July 26, 1973

[21] Appl. No.: 383,305

[52] U.S. Cl. .................................. 318/569
[51] Int. Cl. ............................... G05b 19/18
[58] Field of Search ............ 318/561, 571, 567, 569

[56] References Cited
UNITED STATES PATENTS
3,617,718  11/1971  Dummermuth ................. 318/571 X
3,657,524  4/1972  Bakke ............................ 318/561 X Primary Examiner—T. E. Lynch

[57] ABSTRACT

A device for numerical programmed control of relative movement of a tool and workpiece along an outline in processing automatic machine-tools comprising such principal functional units as operating registers, a buffer storage and a computer made as a common matrix magnetic storage with common digit buses, common reproduction amplifiers, switching keys of reproduction amplifier output signals and regeneration register.

2 Claims, 3 Drawing Figures

DEVICE FOR NUMERICAL PROGRAMMED CONTROL

The present invention relates to devices for controlling industrial plants and, more particularly, to devices for numerical programmed control of relative movements of a tool and a workpiece along an outline in industrial plants.

The invention can be used for numerical programmed control of metal cutting machine-tools along an outline preset by a program carrier in plane and in space.

Known in the art are devices of numerical programmed control providing relative movements of a tool and a workpiece along an outline preset by a program.

The known devices comprise a program input unit connected to a program input control unit, the outputs thereof being connected to a buffer storage, while to the corresponding outputs thereof are connected operating registers and a computer. Said devices are known to comprise also a feed rate setting unit, a control desk, an automatic control unit, a pulse shaping unit of pulses corresponding to elementary movements connected to the automatic machine-tool, to the feed rate setting unit and to the processing automatic machine-tools of an industrial plant. The program input unit is connected to the control desk and to the automatic machine-tool, the feed rate setting unit is connected to the control desk and to the output of the buffer storage, while the operating registers and the computer are connected to the control desk and to the automatic machine-tool.

In the known devices the solution of interpolation problems, computing outline coordinates equidistant to preset outline, the conversion of decimal code into a binary 1, buffer storing of information of a phrase and so forth are effected in individual units having different componenets and various embodiment.

A disadvantage of the known device for numerical programmed control is that its individual units have different components and technical embodiments which results in high cost, large sizes and low dependability of the device.

It is an object of this invention to provide an economical, reliable, small-size device of higher homogeneity and technological effectiveness than heretofore available for numerical programmed control of relative movements of a tool and a workpiece along an outline in industrial plants.

The essence of the inventive concept lies in that in a device for numerical programmed control of relative movements of a tool and a workpiece along an outline in industrial plants, comprising a program input unit connected to a program input control unit, whose outputs are connected to the program input unit, while to the corresponding outputs of a buffer storage are connected operating registers and a computer, and also having a feed rate setting unit, a control desk, a control automatic machine-tool, a pulse shaping unit, whose pulses correspond to the elementary movements, and connected to the control automatic machine-tools of an industrial plant, the program input control unit being connected to the control desk and to the automatic control unit, the feed rate setting unit is connected to the control desk and is electrically coupled to an output of the buffer storage, while the operating registers and the computer are electrically connected to the control desk and to the automatic control unit, the improvements comprising according to the invention, that the operating registers, buffer storage and computer are made as a common magnetic matrix storage having common digit buses, common reproduction amplifiers and switching keys of output signals of the reproduction amplifiers and common regeneration register, the groups of the address buses of the matrix storage corresponding to the buffer storage and operating registers are connected, via respective reversible address decoders, while the address buses corresponding to the computer are connected, via the reversible current pulse shapers, to the outputs of the automatic control unit corresponding to the readout of the reversible address decoders and reversible current pulse shapers, the address write inputs of the reversible address decoder of the buffer storage being connected to the outputs of the automatic control unit and of the program input control unit, respectively, while the write inputs of the reversible address decoder of the operating registers are connected to the outputs of the automatic control unit, the common digit buses of the matrix storage being connected, via the reproduction amplifiers and switching keys of the output signals of the reproduction amplifiers, to the regeneration register, automatic control unit, feed rate setting unit and processing automatic machine-tools of an industrial plant, the improvements also comprising in that a device for numerical programmed control includes a multiprogram operation unit to whose inputs corresponding to the interrogations for executing one of the programs are connected an output of the feed rate setting unit, an output of the program input unit and the outputs of the control automatic control unit - tool, and to whose start input is connected an output of the automatic control unit a signal indicating the availability of computer for executing the next program appearing at this output of automatic control unit, whose outputs corresponding to the beginning of one of the programs are connected to the start inputs of the automatic control unit, the multiprogram operation unit is built around magnetic keys (orgates) which keys combine the functions of storage registers and decoders, and for example comprising two-position and three-position magnetic keys, regeneration cores of the condition of the magnetic keys and a current pulse shaping unit, the read windings of the two-position magnetic keys embodied as a magnetodiode decoder circuit and connected to the write windings of the regeneration cores of the condition of the two-position magnetic keys, the read windings of the three-position magnetic key being connected to the write windings of the regeneration cores of the three-position magnetic key, while in the read circuit of the regeneration cores of the condition of the two-position and three-position magnetic keys are included write windings of the current pulse shaping unit, clear windings of the two-position magnetic keys and regeneration windings of the magnetic condition of the cores of the two-position and three-position magnetic keys.

Pursuant to the present invention, high dependability of the device is insured owing to the incorporation of simplest magnetic cores, not subject to aging, as basic storage and logic elements, effectiveness and homogeneity of equipment is increased due to the fact that various units perform a number of functions, such as buffer storage units, operating register and computer, in a common magnetic matric storage with a common digit reproduction-recording system.

The nature of the invention will be clear from the following description of an embodiment thereof, as applied to controlling an automatic metal cutting machine-tool, and accompanying drawings, wherein.

A device for numerical programmed control of a mutual movement of a tool and a workpiece along an outline in industrial plants comprises a magnetic matrix storage 1 (FIG. 1), which includes three groups of address buses associated respectively with a buffer storage 2, operating registers 3 and computer 4.

Figure 1:
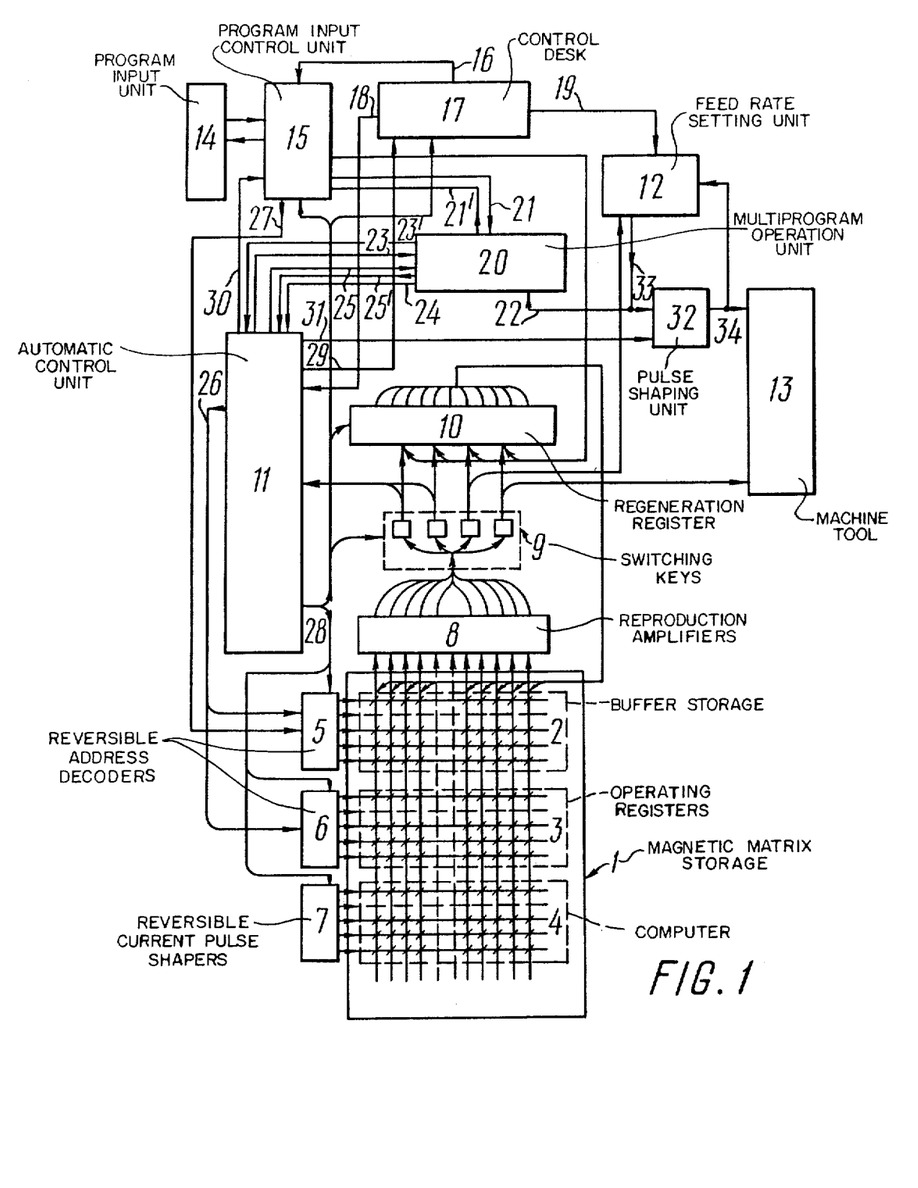
FIG. 1 is a structural diagram of a device for numerical programmed control of movements along an ooutline in industrial plants, according to the invention.

To the address buses of the buffer storage 2 are connected the outputs of a reversible address decoder 5, to the address buses of the operating registers 3 are connected the outputs of a reversible address decoder 6.

To the address buses of the computer 4 are connected the outputs of reversible current pulse shapers 7 which alter the amplitude and polarity of the output pulses depending on the input signals.

Common digit buses of the magnetic matrix storage 1 are connected to the inputs of reproduction amplifiers 8.

The outputs of the reproduction amplifiers 8 are connected, via switching keys 9 of the output signals of the reproduction amppifiers 8, to the inputs of a regeneration register 10, combined with write digit current shapers, the outputs of the regeneration register 10 are connected to common digit buses of the magnetic matrix storage 1, to the inputs of the automatic control unit 11, to the inputs of the feed rate setting unit 12 and to the metal cutting machine-tool 13 having processing machine-tools.

All functional outputs of the reproduction amplifiers 8 hereinabove described and illustrated in FIG. 1 are multichannel. A program input unit 14 is connected to the program input control unit 15. An output 16 of a control desk 17 is connected to the start input of the program input control unit 15, an output 18 of the control unit 17 — to the start input of the automatic control unit 11, while an output 19 of same unit 17 — to the input of the feed rate setting unit 12.

According to the invention, the device is also provided with a multiprogram operation unit 20 utilizing a magnetodiode current distribution circuit, to whose inputs 21, 22 and multichannel input 23 corresponding to the interrogations for executing one of the programs are connected respectively an output of the program input control unit 15, an output of the feed rate setting unit 12 and the outputs of the automatic control unit 11.

A multichannel output 24 of the unit 20 corresponding to the beginning of one of the programs is connected to the start inputs of the automatic control unit 11. An output 25 of the unit 20 is connected to the output of the automatic control unit 11, a signal indicating the availability of computer 4 for executing the next program appearing at this output of the automatic control unit 11.

A multichannel output 26 of the automatic control unit 11 is connected to the write inputs of the reversible address decoders 5 and 6. To the other outputs of the reversible address decoder 5 is connected a multichannel output 27 of the unit 15. A multichannel output 28 of the automatic control unit 11 corresponding to the readout of the units is connected to the inputs of the control desk 17, unit 15, regeneration register 10, switching keys 9, reversible address decoders 5 and 6, reversible current pulse shapers 7. A multichannel output 29 of the automatic control unit 11 is connected to display units of the condition of the device on the control desk 17. An output 30 of the automatic control unit 11 is connected to the stop input of program input control unit 15. An output 31 of the automatic control unit.

A multichannel output 34 of the unit 32 is connected to the inputs of processing machine-tools of the metal cutting machine-tool 13 and to the inputs of feed rate stabilization of the feed rate setting unit 12.

According to the invention, the multiprogram operation unit 20 comprises two two-position and one three-position magnetci keys, which perform the functions of storage registers, the two-position magnetic keys also performing the function of a decoder.

The input circuit 21 (FIG. 2) connected to the unit 15 (FIG. 1) is connected to write windings 35, 36 (FIG. 2) of cores 37, 38 of the two-position magnetic key of the multiprogram operation unit 20, while an output circuit 21' is connected to the unit 15 (FIG. 1).

The input circuit 22 (FIG. 2) connected to the unit 12, is connected to the write windings 39, 40 of cores 41, 42 (FIG. 2) of the two-position magnetic key.

A multichannel input 23 of adjustment and duty alteration unit 20 of multiprogram operation connected to the automatic control unit 11 (FIG. 1) is connected to a circuit comprising write windings 43, 44, 45, 46, 47, 48, 49, 50, 51, 52, 53, 54 (FIG. 2) of cores 37, 38, 41, 42 and 55, 56, 57 of the two-position and three-position magnetic keys while the circuit of the multichannel output 23' of the unit 20 is connected to the unit 11 (FIG. 1).

The multiprogram operation unit 20 is also provided with an operating cycle pulse device 58 (FIG. 2) consisting of two current pulse shapers. Each current pulse shaper consists of a transistor 59, diode 60 included into the transistor 59 emitter circuit, load resistor 61, and also, a non-linear transformer having a magnetic core 62 fabricated from a square-loop hysteresis material, and two windings, i.e. a winding 63 included into the transistor base circuit, windings 64 and 64' included into the transistor collector circuit and windings 65, 66 which are used as read windings and write windings respectively.

Figure 2:
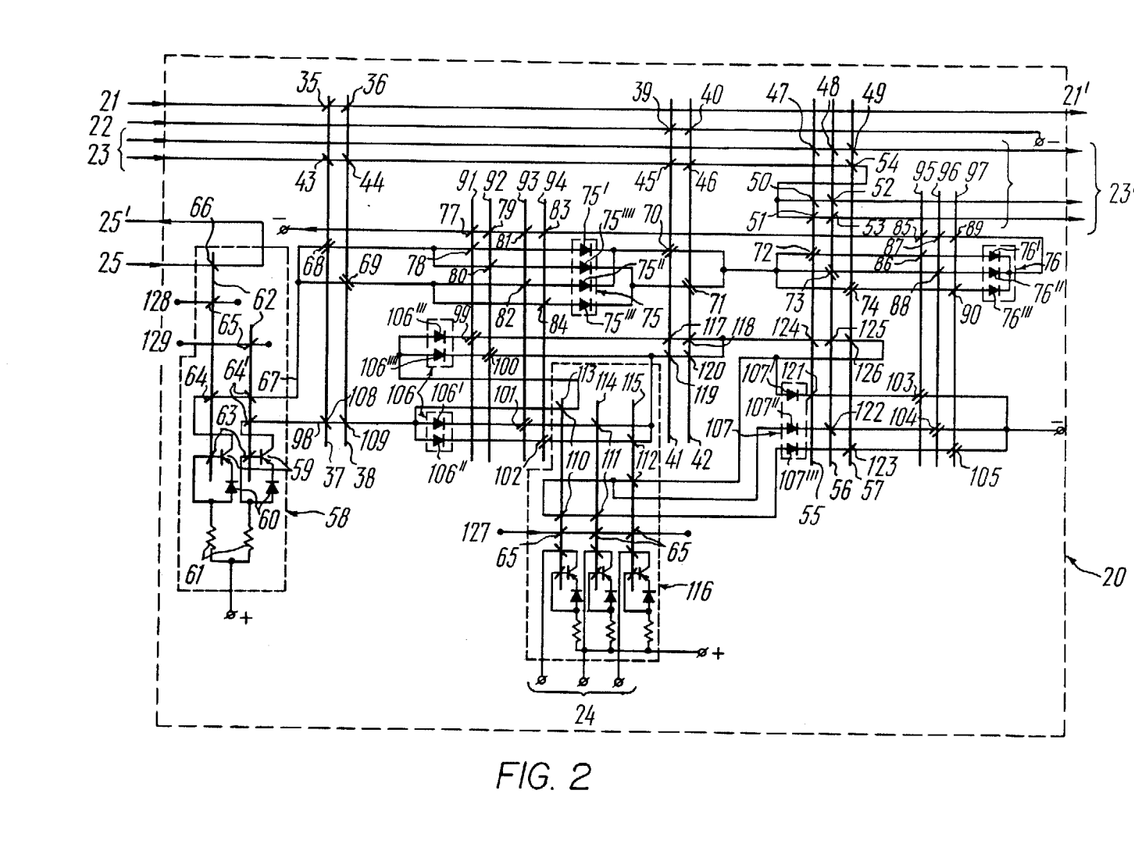
FIG. 2 is a schematic circuit diagram of a multiprogram operation unit, according to the invention.

The input circuit 25 of the unit 20 is connected to the operating cycle pulse device 58 and comprisis a write winding 66, while the output circuit 25' of the unit 20 is connected to the unit 11 (FIG. 1).

An output 67 (FIG. 2) of the operating cycle pulse device 58 is connected to a circuit comprising read windings 68, 69, 70, 71, 72, 73, 74 of cores 37, 38, 41, 42, 55 to 57, group of diodes 75', including diodes 75, 75'', 75''', 75'''' of a group of diodes 76 including diodes 76', 76'', 76''' and write windings 77, 78, 79, 80, 81, 82, 83, 84, 85, 86, 87, 88, 89, 90 of regeneration cores 91, 92, 93, 94, 95, 96, 97 of the magnetic keys comprised in the unit 20, according to the invention.

An output 98 of the operating cycle pulse device 58 is connected to a circuit comprising read windings 99, 100, 101, 102, 103, 104, 105 of regeneration cores 91 to 97 of the condition of the magnetic keys, group of diodes 106 including diodes 106', 106'', 106''', 106'''', group 107 including diodes 107', 107'', 107''', clear windings 108, 109 of cores 37, 38 of the two-position magnetic key, write windings 110, 111, 112 of the cores 113, 114, 115 of the current pulse shaping unit 116 comprised in the unit 20, according to the invention (current pulse shapers of the unit 116 are made similar to those of the operating cycle pulse device 58), windings 117, 118 of regeneration of the magnetic condition of the cores 41, 42 of the two-position magnetic key and clear windings 119, 120 of the cores 41, 42 of the two-position magnetic key and regeneration windings 121, 122, 123, 124, 125, 126 of the magnetic condition of the cores 55, 56, 57 of the three-position magnetic key, the read windings 68, 69, 70, 71 of the two-position magnetic keys being connected as a magneto-diode decoder and connected to the write windings 78, 80, 82, 84 of the regeneration cores 91, 92, 93, 94 of the two-position magnetic keys, while the read windings 72, 73, 74 of the three-position magnetic key are connected to the write windings 86, 88, 90 of the regeneration cores 95, 96, 97 of the three-position magnetic key. Into the read circuits of the regeneration cores 91 to 97 are included write windings 110, 111, 112 of the current pulse shaper unit 116, clear windings 108, 109, 119, 120 of the two-position magnetic keys and regeneration windings 117, 118, 121, 122, 123, 124, 125, 126 of the magnetic condition of the cores of the two-position and three-position magnetic keys.

Read circuit 127, of the current pulse shapers of the unit 116, current pulse shapers of the operating cycle pulse device 58, and connected to the automatic control unit (FIG. 1), are connected to the windings 65 (FIG. 2) of the current pulse shapers of the unit 116 and operating cycle pulse device 58, respectively.

Symbols + and − in FIG. 2 correspond to terminals of the power supply source of relevant polarity. (Connections of the circuits 127, 128 and 129 to the automatic control unit 11 and the power supply source are not shown in the Figure).

Figure 3:
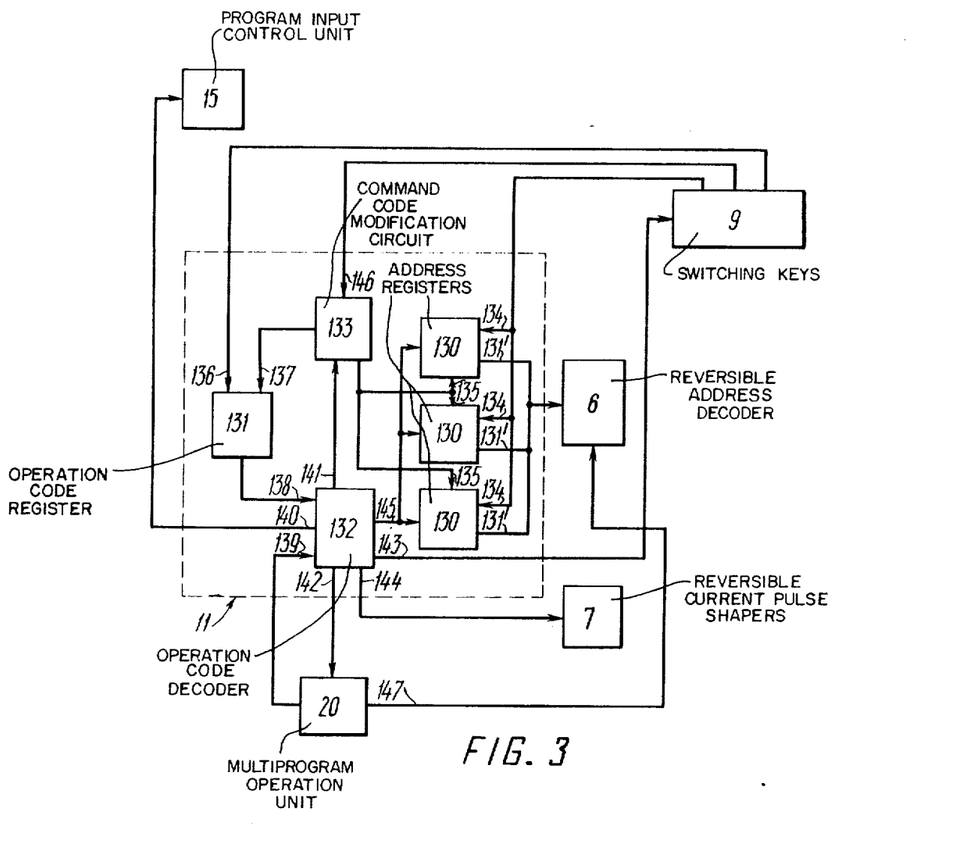
FIG. 3 is a block diagram of the automatic control unit according to the invention.

Let us consider now an exemplary embodiment of the device for numerical programmed, including the control automatic control unit made according to the diagram of FIG. 3. The device may contain one mutual reversible address decoder 6.

The automatic control unit 11 is provided with one or several address registers 130 whose outputs 131' are connected to the inputs of the reversible address decoders, an operation code register 131, an operation code decoder 132 and a command code modification circuit 133.

An input 134 of the address registers 130 is connected to the corresponding output of the switching keys 9, another input 135 of the registers 130 is coupled to the output of the command code modification circuit 133.

An input 136 of the operation code register 131 is connected to the corresponding output of the switching keys 9, another input 137 of the register 131 is connected to the corresponding output of the command code modification circuit 133 and the output of the register 131 is coupled to an input 138 of the operation code decoder 132.

An input 139 of the decoder 132 is connected to the corresponding output of the multiprogram operation unit 20, an output 140 of the decoder 132 is connected to the input of the program input control unit 15, an output 141 of the decoder 132 is coupled to the corresponding input of the command code modification circuit 133, an output 142 of the decoder 132 is coupled to the corresponding input of the unit 20, an output 143 of the decoder 132 is connected to the control input of the switching keys 9, an output 144 of the decoder 132 is coupled to the input of the reversible current pulse shapers 7 and an output 145 of the decoder 132 is connected to the control input of the address registers 130.

An input 146 of the instruction code modification circuit 133 is connected to the corresponding output of the switching keys 9.

An output 147 of the unit 20 is coupled to the input of the reversible address decoder 6. All the inputs and outputs are multichannel.

The device for numerical programmed control hereinabove described is designed for programmed control of mutual movements of the working tools of a metal cutting machine-tool 13 (FIG. 1) machining a workpiece.

The output signals of the device are formed as a digitalpulsed code supplied to the drive of the metal cutting machine-tool 13. The number of outputs of the device and the number of the drives of the metal cutting machine-tool 13 correspond to the number of coordinates of the working tools in space. The drive and the working tools of the metal cutting machine-tool 13 as well as the workpiece are not shown in the Figure.

The input information is displayed as digits on a punched tape of the program input unit 14 (the tape is not shown in the figure) and contains the data on the coordinates of the working tools of the metal cutting machine-tool 13 and a control command for controlling the working tools of the metal cutting machine-tool 13.

The data being introduced is divided into portions which form frames. Each frame contains informations about alteration of the position of the working tools of the metal cutting machine-tool 13 between two reference points.

The data input is effected sequentially by frames with intervals in-between.

The device hereinabove described effects the conversion of the introduced data and its buffer storing, interpolation of the mechanical trajectory of the working tools of the metal cutting machine-tool 13 and shaping of pulses across a multichannnle output 34 connected to the drives of the machine-tool 13, computing the coordinate correction of the final point of the trajectory of movement of the working tools of the machine-tool 13 following an equidistant outline. The equidistant outline is a trajectory of movement of the working tools of the machine-tool 13 equidistantly spaced from a trajectory preset by the program by the value of variation of the cutting tool radius R.

The value of variation the cutting tool radius R is determined by the wear of the cutting tool and is introduced by the operator into the control desk 17 before starting work.

According to the above functions, three programs are introduced into the device hereinabove described: a data program, a program of computing the trajectory of movement of the working tools of the machine-tool 13 and shaping the pulse signals across the multichannel output 34 connected to the drives of the machine-tool 13, and a program of computing corrections when the working tools of the machine-tool 13 move along an equidistant outline.

The storage and conversion of the data according to each of the three programs are effected in the magnetic matrix storage 1, the buffer storage 2 being used for storing the data about the subsequent frame introduced from the program input unit 14.

The operating registers 3 perform the function of the storage when the above programs are being computed.

The computer 4 serves for performing logical functions during calculations.

The address buses of the computer 4 are connected to the outputs of the reversible current pulse shapers 7, which shape the current pulses of various amplitudes I, 0.5 I, +I, −I (where I is capital i denoting current), and polarities +I, −I.

The magnetic matrix storage 1 operates in the write and read modes.

In the write mode current pulses operate in the magnetic matrix storage 1, in the address and digit buses. The time of a single cycle action of these pulses corresponds to the write cycle.

In the read mode the current pulses operate in the address buses only and the read cycles correspond to these pulses.

The group of the magnetic matrix storage 1 connected to each address bus forms a line of the storage 1 with corresponding address.

Depending on the amplitude and polarity of the current pulses, in the address buses of the computer 4 logical operations of all digits of the word stored therein, and the words supplied along the digit buses of recording are performed. During the read cycle of the computer 4 either reading of one line is effected by the current pulse −I which corresponds to the arrival of a signal across the input of the reproduction amplifier 8 of the $i$-digit $ai$ ($ai$ being the logic variable corresponding to the $i$-digit of the word stored in the line), or reading of one line by the current pulse +I which corresponds to the arrival of signal across the input of the reproduction amplifier 8 of the $i$-digit $\bar{a}i$ ($\bar{a}i$ being the inversion of the logic variable ai), or reading of two lines by the currents −I simultaneously which corresponds to the arrival of the signal across the input of the reproduction amplifier 8 corresponding to the logic function $a_i^1 \vee a_i^2$ (1, 2 being the number of the read line), or reading of two lines by the currents +I which corresponds to $\bar{a}_i^1 \bar{a}_i^2$, or finally, simultaneous reading of one line by the current +, while the other line by the current −I which corresponds to $a_i^1 \vee \overline{a_i^2}$. The latter operation can be used, provided $a_i^1 \wedge \overline{a_i^1} = 0$. Here and further, the symbols $\vee$, $\wedge$ denote logic operations of disjunction and conjunction respectively.

During the write cycle in any line either ordinary writing with preliminary readout is effected, the core of the $i$-digit corresponding after the writing to $bi$ ($bi$ being the logic variable corresponding to the $i$-digit of the word supplied along the write digit buses), or writing without preliminary readout by the address current +0.51, the core condition of the $i$-digit corresponding to $ai \vee bi$ (ai being the logic variable corresponding to the $i$-digit of the word stored in the line before writing), or writing without preliminary readout with the address current of −I, the core condition of the $i$-digit after the writing corresponding to $a_i b_i$ All the above operations during the writing cycle are effected simultaneously in an arbitrary number of the lines of the computer 4, with arbitrary conbinations of operations in various lines.

The data read out from the lines of the magnetic matrix storage 1 is recorded, via the reproduction amplifiers 8, into the regeneration register 10 without being shifted, i.e. the $i$-digit of the line of the storage 1 is connected to the $i$-digit of the regeneration register 10, or with a shift, i.e. the $i$-digit of the line of the storage 1 is connected to the ($i$+1) digit of the regeneration register 10, or is transmitted into the automatic control unit 11, feed rate setting unit 12, or into the metal cutting machine-tool 13 with processing machine-tools.

The reproduction amplifiers 8 produce current pulses across their outputs.

The output signals from the reproduction amplifiers 8 are switched over with the help of switching keys 9.

Availability of a complete functional set of logical operations performed in the lines of the computer 4, also, the shift operations allow for any logical or computing operation to be performed in the device hereinabove described, expressing its operation algorithm following said elementary operations. The possible computing operations in the register of commands include addition, subtraction, addition of unity, multiplication by ten.

In order to accelerate addition operations, one of the switching keys 9 is used for connecting the outputs of the reproduction amplifiers 8 to the read inputs of the regeneration register 10 digits, providing for excitation of relevant outputs of the reproduction amplifier 8. With the same aim the start input of the write digit current shaper of the ($i$+1)-digit is connected to the shaper of the $i$-digit in the regeneration register 10. The write digit current shapers are not shown in the figure. Said connections allow for the addition to be effected with a through carry between the digits.

The data in the program input unit 14 are arranged on punched tapes in the form of lines whose readout is effected in series. As any subsequent line is carried over from the unit 14 to the unit 15, is then transmitted into the storage 1 in order to free the space in the unit 15 for reception of the next line.

The time for transmitting the lines from the unit 14 to the unit 15 is determined by the unit 14 proper, irrespective of operation of remaining units.

The time of shaping of control pulses by the unit 32 used for controlling the drives of the metal cutting machinetool 13 are set by the feed rate setting unit 12. This determines the frequency of elementary movements (steps) of the working tools of the machine-tool 13.

The selection of a coordinate governing the next step is done as a result of fulfilling the computing program of the movement trajectory of the working tools of the machinetool 13.

The introduction of the next line including the decimal to binary code conversion, computing the movement trajectory of the working tools of the machine-tool 13 and shaping the pulsed signals sent to the drives of the machine-tool 13, also, computing the corrections during the movement of the working tools of the machine-tool 13 along an equidistant outline are effected in the time separation duty with the help of the multiprogram operation unit 20. Interrogations for fulfilling each of the three programs are sent into the unit 20, the latter being constructed so that with the interrogations concerning all the three programs, the first program being fulfilled is the data input program, the second is the program of computing the trajectory of movement of the working tools of the metal cutting machine-tool 13, and the third is the program of computing corrections during the movement of the working tools of the machine-tool 13 along an equidistant outline.

The device for numerical programmed control hereinabove described operates as follows. The device is triggered by a current pulse derived from the output 18 of the control desk 17 and applied to the automatic control unit 11.

The automatic control unit 11 starts operating, fulfilling the program of carrying the information contained in the buffer storage 2 into the operating registers 3. This carry program is fulfilled as a series of commands, and is a part of the program for computing the trajectory of the movement of the working tools of the machine-tool 13.

In accordance with each command the address information is applied to the inputs of the reversible address decoders 5 and 6.

Any command being fulfilled consists of exciting a series of corresponding signals derived from the multichannel output 28 of the automatic control unit 11. These signals in the form of current pulses excite the reversible address decoders 5 and 6, reversible current pulse shapers 7, regeneration register 10 and switching keys 9 in the required sequence. In addition, a pulse derived from the multichannel output 28 is used to read the information from the program input control unit 15 and to carry it to the storage 1 via the regeneration register 10, also, to read the information from the control desk 17 and to carry it into the storage 1 via the unit 15 and regeneration register 10.

During this period, the readout and writing of the buffer storage 2, operating registers 3 and logical conversions in the computer 4 are effected.

Any of the commands is fulfilled as follows: the words from the lines of the buffer storage 2 or from the operating registers 3 are re-written into the lines of the computer 4. The addresses of these lines have been preliminary introduced from the output 26 of the automatic control unit 11 into corresponding reversible address decoders 5 and 6. The "word" here denotes information stored in one line.

The information introduced into the computer 4 is converted in accordance with an algorithm corresponding to the given command and expressed as elementary operations of conjunction, disjunction, inversion, shift and through carry.

The result of fulfilling a command obtained in the computer 4 is transmitted in the result line of the operating registers 3 and buffer storage 2 in compliance with the address identified by the control automatic machine-tool 11.

When the information is being transmitted from the buffer storage 2 into the operating registers 3, peculiarities typical of each given frame are revealed, in particular, the trajectory approximation law (linear or circular approximation). Complying with this, the automatic control unit 11 sets the multiprogram operation unit 20, by sending a signal across its input 23, to a duty corresponding to the control of movements of the working tools of the machine-tool 13 to follow a trajectory preset by the program, or along an equidistant trajectory.

Following the transmission of data from the buffer storage 2, the latter is emptied and used for reception of the next frame.

To this aim a signal from the output 30 of the automatic control unit 11 is sent to the unit 15 for triggering the program input unit 14. The beginning of completing a phrase transmitted from the buffer storage 2 is matched with the introduction of the next phase into the buffer storage 2.

The interrogations for completing the programs are supplied into the unit 20 as follows: to the input 21 of the multiprogram operation unit 20 is supplied from the unit 15 an interrogation for introducing a subsequent line received from the program input unit 14, to the input 22 of the unit 20 is supplied from the feed rate setting unit 12 an interrogation for computing the trajectory of movement of the working tools of the machine-tool 13, the results of the program being used for selecting a coordinate along which the next elementary movement, i.e. next step, is to be effected.

To determine the coordinate used for performing the next step, an evaluation function is calculated. This function is plotted so that the function sign shows one of the coordinates following which the next step is taken. Therefore the number of evaluation functions depends on the number of coordinates within which the movement trajectory is computed.

The frequency of elementary movements, that is the pulse frequency across the output of the unit 12 for feed rate setting is determined by the code of number supplied to the input of the unit 12 from the reproduction amplifiers 8 via a corresponding switching key 9 during the transmission of the information of a phrase from the buffer storage 2 into the operating registers 3.

Besides, the alteration of the pulse frequency across the output of the feed rate setting unit 12 is effected by a signal derived from the output 19 of the control desk 17.

The linear speed of the movement of the working tool of the metal cutting machine-tool 13 is determined not only by the frequency of steps preset by the unit 12, but by the character of sequence of the coordinates used for performing the steps, therefore, to ensure stabilized speed, a feedback is provided from the output of the unit 32 to the input of the unit 12.

The fulfilling of the program of determining corrections during the movement of the working tools of the machine-tool 13 along an equidistant outline is done during all periods of time free from said two programs. The termination of the corrections calculations is defined by appearance of the clear signal of calculating corrections during the movement of the working tools of the machine-tool 13 along an equidistant outline, supplied to the input 23 of the unit 20 from the automatic control unit 11.

The value R necessary for checking the termination of introduction of corrections is supplied into the operating registers 3 via the unit 15 from the output 16 of the control desk 17.

The termination of any said programs is accompanied by the program clear signal supplied across the input 25 of the unit 20 from the automatic control unit 11.

As the signal is applied to the input 25, the unit 20 produces a signal about the beginning of the subsequent program derived from the output 24 and supplied to the automatic control unit 11.

The program splitting depending on the calculation results is effected by the automatic control unit 11. To this aim across the input of the automatic control unit 11 is supplied information from the outputs of the reproduction amplifiers 8 via corresponding switching keys 9.

In addition to the above main programs the device for numerical programmed control also the execution of the R value input program from the control desk 17 into the operating registers 3, the input program from the control desk 17 of a number of elementary movements until the end of the phrase fulfillment corresponding to the signal acceleration-bracking until a new value of speed is attained at the end of subsequent phrase, also, the program of emergency withdrawal of the tool in case of malfunction.

All the above programs are fulfilled with the unit 20 being inoperative, since there is no need to employ the basic programs.

In the unit 20 (FIG. 2) the two-position magnetic key utilizing cores 37, 38 stores the information about the presence of interrogation for the program of transmitting a line from the program input control unit 15 (FIG. 1) into the buffer storage 2. The interrogation is supplied as a current pulse across the input 21 (FIG. 2) to the write windings 35, 36 and serves for magnetizing the cores 37, 38.

The two-position magnetic key utilizing cores 41 and 42 stores the information about the presence of interrogation for the program of computing the movement trajectory. The interrogation is supplied across the output 22 and to the windings 39, 40, thus magnetizing the cores 41, 42.

The three-position magnetic key utilizing cores 55, 56, 57 stores the information about the operating duty of the unit 20. In case the maximum conductance is exhibited by the circuit comprising the read winding 72 of the core 55, then corrections should be calculated during the movement of the working tools of the metal cutting machine-tool 13 along an equidistant outline, in case the maximum conductance is in the circuit comprising the read winding 73 of the core 56, corrections should not be calculated, and if the maximum conductance is in the circuit comprising the read winding 74 of the core 57, it means that there are no signals across the output 24.

The adjustment of the three-position magnetic key utilizing the cores 55, 56, 57 under each of the two said conditions is effected by the current pulses applied across the input 23 of the unit 20 along the windings 51, 53, 54 and 50, 52, 54 respectively, and in addition, the adjustment of the three-position magnetic key under the second operating condition is effected by a signal derived from the input 23 of the unit 20 along the winding 47, 48, 49.

The setting of the three-position magnetic key into nonoperating condition is effected along the initial setting circuit (not shown in the Figure).

Operating cycle pulses shaped by the automatic control unit 11 (FIG. 1) are supplied across the inputs 127, 128, 129, it is being conditionally assumed that across the inputs 127, 128 (FIG. 2) are applied even parity cycle while across the input 129 are applied odd parity pulses.

By the end of subsequent program across the input 25 of the operating cycle pulse device 58 there (FIg. 1) applied from the automatic control unit 11 (FIG.1) a current pulse which prepares the current pulse shaper of the operating cycle pulse device 58 (FIg. 2) along the winding 66. This takes place in the odd parity pulse.

The subsequent pulse applied across the input 128 of the operating cycle pulse device 58 effects the readout of the current pulse shaper along the winding 65.

In the subsequent even cycle the operating cycle pulse device forms a current pulse across the output 67, the pulse in accordance with the condition of the cores 37, 38, 41, 42, 55 to 57 writes into the regeneration cores 91 to 97 of condition of the magnetic keys, and also prepares the second current pulse shaper along the winding 64'. During the readout of this current pulse shaper along the winding 65 in the next odd cycle across the output 98 is formed a current pulse which clears the two-position magnetic key utilizing cores 37, 38 and writes on the cores 41, 42, 55, 56, 57 and on the cores 113, 114, 115 of the current pulse shaping unit 116 in accordance with the condition of the regeneration cores 91 to 97.

Depending on the condition of the regeneration cores 91 to 97 either one of the cores 113 to 115 becomes prepared, or none. Since the first program being fulfilled is the data input program and hence the information about the input interrogation need not be stored, during the circuit operation the two-position magnetic key of the data input is always cleared. To this end, into the circuit 98 are included clear windings 108, 109 of the two-position magnetic key utilizing the cores 37, 38.

The two-position magnetic key on cores 41 and 42 is cleared only in case an interrogation is introduced from the feed rate setting unit 12 (FIG. 1) and no interrogation supplied from the program input control unit 15.

Since the calculation of corrections of the equidistant outline is done during free time, the three-position magnetic key on cores 55 to 57 (FIG. 2) is cleared by the pulse across the input 23.

In the next ensuing even parity pulse the readout is effected across the input 127 of the current pulse shaping unit 116.

A signal informing about the next program derived from the output 24 is applied to the input of the automatic control unit 11 (FIG. 1).

In order not to lose the interrogation (odd parity) which occasionally coincides with the current pulse across the output 98 (FIg. 2) of the unit 58, the write windings 35, 36, 39, 40, 43, 44, 45, 46, 47 to 49 on the cores 37, 38, 41, 42, 55 to 57 from the inputs 21 to 23 are made with prevailing m.m.f. as compared to the write windings 108, 109, 119, 120, 121, 122, 123, 124, 125, 126 on these cores in the circuit connected to the output 98.

For example, the write windings 78, 80, 82, 84 arranged individually in the circuit of each diode 75', 75'''', 75'', 75''' respectively, exceed twice by the number of turns common write windings 77, 79, 81 83 included into unbranched sections of the output circuit of the operating cycle pulse device 58.

The multiprogram operation unit 20 operates as follows: the initial condition of the unit 20 is when all the three interrogations are present.

The two-position magnetic key on the cores 37 and 38 stores the information about an interrogation for the program of transmission of lines (interrogation about the information input).

The two-position magnetic key on the cores 41, 42 stores the information about an interrogation for calculating the trajectory of movement of the working tools of the metal cutting machine-tool 13 (Fig. 1).

The three-position magnetic key on the core 55, 56, 57 FIG. 2) stores the information about an interrogation for calculating the correction when the working tools of the machine-tool 13 (FIg. 1) move along an equidistant outline.

Across the input 25 (Fig. 2) of the unit 20 in the odd cycle is applied a current pulse corresponding to the end of the subsequent program and prepares the core 62 along the winding 66 of the first current pulse shaper of the operating cycle pulse device 58. In the next ensuing even parity pulse the first current pulse shaper functions, forms a current pulse across the output 67 of the operating cycle pulse device 58 and prepares the second current pulse shaper along the winding 64'. The current pulse derived from the output 67 of the operating cycle pulse device 58 passes along the following circuit; comprising the read winding 68 of the cores 37 to the two-position magnetic key, write windings 78 of the regeneration core 91 of the condition of the magnetic key, read winding 70 of the core 41 of the two-position magnetic key, read winding 72 of three-position magnetic key, write winding 86 of the regeneration core 95 of the condition of the magnetic key, diode 76', write windings 89, 87, 85 of the regeneration cores 97, 96, 95 of the condition of the magnetic key, write windings 83, 81, 79, 77 of the regeneration cores 94, 93, 92, 91 of the condition of the magnetic keys and minus terminal of the power supply source. The current pulse writes in the regeneration cores 91 to 97 of the condition of the magnetic keys and prepares them as required.

During the next odd parity pulse the second current pulse shaper of the operating cycle pulse device 58 functions and forms a current pulse across the output 98 of the operating cycle pulse device 58, the pulse flowing along the circuit comprising clear windings 108, 109 of the cores 37, 38 of the two-position magnetic key, write winding 110 of the core 113 of the cureent pulse shaping unit 116, diode 106''', read winding 99 of the regeneration core 91 of the condition of magnetic keys, regeneration windings 117, 118 of the magnetic condition of the cores 41, 42 of the two-position magnetic key, regeneration windings 124, 125, 126 of the magnetic condition of the cores 55, 56, 57 of the three-position magnetic key, diode 107', regeneration winding 121 of the magnetic condition of the core 55 of the three-position magnetic key, read winding 103 of the regeneration core 95 of the condition of the magnetic key and to the minus terminal of the power supply source, the two-position magnetic key thus being cleared on the cores 37, 38 and written on the cores 41, 42, 55 to 57 and on the core 113 of the unit 116.

During the next even parity pulse the first current pulse shaper of the unit 116 functions and forms across the output 24 a signal, i.e. information input, the condition of the unit 20 at this instant being: the interrogation about the data input is absent on the two-position magnetic key on the cores 37 and 38, the latter key on the cores 41 and 42 stores the information about an interrogation for the calculation of the trajectory of movement of the working tools of the metal cutting machine-tool 13 (FIG. 1), the three-position magnetic key on the cores 55 to 57 (FIG. 2) stores the information about an interrogation for the calculation of correction during the movement of the working tools of the machine-tool 13 (FIg. 1).

The next pulse across the output 67 (FIg. 2) of the operating cycle pulse device 58 passes along a circuit comprising the read winding 69 of the core 38 of the two-position magnetic key, write winding 82 of the regeneration core 93 of the condition of the magnetic key, diode 75'', read winding 70 of the core 41 of the two-position magnetic key, read winding 72 of the core 55 of the three-position magnetic key, write winding 86 of the regeneration core 95 of the condition of the magnetic key, diode 76', write windings 89, 87, 85 of the regeneration cores 97, 96, 95 of the condition of the magnetic key, write windings 83, 81, 79, 77 of the regeneration cores 94, 93, 92, 91 of the magnetic keys and minus terminal of the power supply source.

The next pulse across the output 98 of the operating cycle pulse device 58 flows along the circuit comprising clear windings 108, 109 of the cores 37, 38 of the two-position magnetic key, diode 106', read winding 101 of the regeneration core 93 of the condition of the magnetic key, winding 111 of the core 114 of the current pulse shaping unit 116, clear windings 119, 120 of the cores 41, 42 of the two-position magnetic key, regeneration windings 124, 125, 126 of the magnetic condition of the cores 55, 56, 57 of the three-position magnetic key, diode 107', regeneration winding 121 of the magnetic condition of the core 55 of the three-position magnetic key, read winding 103 of the regeneration core 95 of the condition of the magnetic key and minus terminal of the power supply source.

During the next even parity pulse the second current pulse shaper of the unit 116 operates, which forms across the output 24 a signal — calculation of the trajectory of movement of the working tools of the machine-tool 13 (FIG. 1), while the condition of the unit 20 (FIG. 2) at this instant is as follows: the cores 37, 38 of the two-position magnetic key are free from the interregation for the data input, the cores 41, 42 are free from the interrogation for the calculation of the trajectory of movement of the working tools of the machine-tool 13 (FIG. 1), while the three-position key stores on the cores 55, 56, 57 (FIG. 2) the information about the interrogation for the calculation of corrections during the movement of the working tools of the machine-tool 13 (FIG. 1) along the equidistant outline.

The next pulse across the output 67 of the operating cycle pulse device 58 passes along the circuit comprising the read winding 69 of the core 38 of the two-position magnetic key, write winding 84 of the regeneration core 94 of the condition of the magnetic key, diode 75''', read winding 71 of the core 42 of the two-position magnetic key, read winding 72 of the core 55 of the three-position magnetic key, write winding 86 of the regeneration core 95 of the magnetic key condition, diode 76', write windings 89, 87, 85 of the regeneration cores 97, 96, 95 of the magnetic key condition, write windings 83, 81, 79, 77 of regeneration cores 94, 93, 92, 91 of the condition of the magnetic keys and minus terminal of the power supply source.

The next pulse across the output 98 of the operating cycle pulse device 58 passes along the circuit comprising the clear windings 108, 109 of the cores 37, 38 of the two-position magnetic key, diode 106'', read winding 102 of the regeneration core 94 of the magnetic key condition, write winding 112 of the core 115 of the third pulse shaper of the unit 116, clear windings 119, 120 of the cores 41, 42 of the two-position magnetic key and further via the windings as described hereinabove to the minus terminal of the power supply source.

During the next even parity pulse the third current pulse shaper of the unit 116 functions, and forms a signal across the output 24 the interrogation about the calculation of corrections during the movement of the working tools of the machine-tool 13 (FIG. 1) along the equidistant outline.

The terminal condition of the unit 20 (FIG. 2): the cores 37, 38 of the two-position magnetic key are free from the interrogation for the data input, the cores 41, 42 of the two-position magnetic key are free from the interrogation for the calculation of the trajectory of the movement of the working tools of the machine-tool 13 (FIG. 1), while the cores 55 to 57 (FIG. 2) of the three-position magnetic key contain the interrogation for the calculation of the correction during the movement of the working tools of the machine tool 13 (FIG. 1) along the equidistant outline.

The automatic control unit 11 (FIG. 1) can be a device with a preset program or as a device shown schematically in FIG. 3, operating according to a program stored in the magnetic matrix storage 1 (FIG. 1). The program selected is fed from a punched tape prior to connecting the device for numerical programmed control to the machine tool. This permits the operation of the object of control to be programmed with due regard for the particulars thereof, i.e. the operation programs of the device for numerical programmed control to be modified without structural changes in the device.

The code of a command comprises an operation code, a modification sign and one or several address codes. As an example we take a three-address instructions: the first address is an address of the first operand (same the result address), the second address is that of the second operand and the third address is that of a following instruction. The utilization of a free sequence of instructions makes an instruction counter unnecessary since the programs contain a relatively large amount of unconditional transfer, permits the program length to be reduced, and also makes it possible to split the programs on account of changing the address of the following instruction. This modification may be carried out by any logic and arithmetic operation between a given instruction and a digit according to the program of the device operation.

The automatic control unit permits the program being carried out to be interrupted when there is an interrogation to fulfil a program of a higher priority.

All programs according to which the device operates are subdivided into two groups. The first group includes short programs (line input, computation, acceleration, braking of a tool or blank, etc.) the result of fulfilling thereof should be received as fast as possible after these programs have been requested. The second group includes long programs (analysis of introduced frame, calculation of corrections for varying dimensions of cutting tools, etc.).

The results of fulfilment of long programs are required when carrying out the next (introduced) frame. Thus, when there is an interrogation for the fulfilment of a short programs is not interrupted. They are carried out in the sequence of incoming interrogations.

Let us now consider the fulfilment of an instruction without modification. The code of the instruction is read out from the magnetic matrix storage 1 (FIG. 1). A portion of the instruction code, corresponding to the operation code, passes into the operation code register 131 (FIG. 3), other portions of the instruction code, corresponding to the addresses of operands and the next instruction address, pass to the address registers 130. The output signals of the reproduction amplifiers 8 (FIG. 1) are switched by the switching keys 9 according to signals coming to the input of the switching keys 9 from the output 143 (FIG. 3) of the operation code decoder 132. From the register 131 the operation code passes to the input 138 of the decoder 132. According to the operation code, the operation code decoder 132 forms a timing sequence of signals necessary to fulfill the instruction. These signals are supplied from the output 144 of the decoder 132 instruction the input of the reversible current pulse shapers 7, from the output 143 of the decoder 132 to the control input of the switching keys 9, from the output 145 of the decoder 132 to the control inputs of the address registers 130. Upon receiving the control signal by the first and second registers 130, the address code is transferred from these registers 130 into the reversible address decoder 6. Information disposed according to addresses recorded in the first and second address registers 130 is read out from the operating registers 3 (FIG. 1) and transferred into the computer 4. Information obtained in the computer 4 upon carrying out a logical or calculating operation is transferred there-from into the operating registers 3 according to the address stored in the first address register 130 (FIG. 3). After this, the address of the next instruction is transferred from the third address register 130 into the reversible address decoder 6 and the instructure stored according to this address is read out from the magnetic storage 1 (FIG. 1).

If the instruction is subject to modification, then unity (presence of modification sign) is recorded in a definite digit of the instruction code. According to this sign coming from the output 141 (FIG. 3) of the operation code decoder 132 and to the condition of modification coming from the reproduction amplifiers 8 (FIG. 1) through the switching keys 9 to the input 146 (FIG. 3) of the instruction code modification circuit 133, the circuit 133 modifies the operation code and the address codes in the instruction. The modified address codes are delivered to the inputs 135 of the address registers 130 and the modified operation code passes to the input 137 of the operation code register 131.

The instruction is further fulfilled as described hereinabove.

A sequence of fulfilment of instructions may be varied in accordance with interrogations from the multiprogram operation unit 20, which are supplied from the output thereof to the input 139 of the operation code decoder 132. According to this signal, the next in turn instruction, instead of being performed, is recorded into the operating registers 3 (FIG. 1) in accordance with the address coming in the reversible address decocer 6 from the output 147 (FIG. 3) of the unit 20. Then the first instruction of the program being interrogated is fulfiled. The address of this instruction is also delivered to the reversible address decoder 6 from the output 147 of the unit 20.

Upon completing the program being interrogated, the unit 20 is supplied with a signal thereabout coming from the output 142 of the operation code decoder 132. After this signal the interrupted program is continued. The address according to which the next instruction thereof is recorded passes from the unit 20 into the reversible address decoder 6.

The embodiment of the automatic control unit in the form of address registers, an operation code register, an operation code decoder and an instruction code modification circuit permits programs to be constructed with due regard for peculiarities of the object to be controlled, without structural changes in the device.

The device for numerical programmed control hereinabove described is distinguished by homogeneity of equipment of such principal functional units such as buffer storage 2, operating registers 3, computer 4.

The functions of these units are fulfilled in a homogeneous magnetic matrix storage 1 owing to multifunctional usage of its components (square-loop hysteresis cores). The device is further characterized by compactness of the components of the matrix storage 1, high reliability, small number of contact joints, which determines the effectiveness and reliability of the device.

Details about the different units of the above device for numerical programmed control are available as follows:

1. Reversible address decoders 5, 6: Cf. Koslov V. G. et al., Reversible Decoder, U.S.S.R. Author's Certificate No. 247,351.
2. Reversible current Pulse shapers 7 and switching keys 9: Cf. Gilligen T. J. et al., High Speed Ferrite 2½ D Memory, AFIPS, 1965, Fall Joint Computer Conf., 27, pt. 1, pp. 1011–1022.
3. Reproduction amplifiers 8: Cf. Integrated Amplifiers are Flexible High-Frequencies, Electronic Design, 1965, V. 13, No. 8, p. 64.
4. Regeneration register 10: Cf. Koslov V. G. et al. Device for Parallel Summing of Two Digits, U.S.S.R. Author's Certificate No. 268,498.
5. Automatic control unit 11: Cf. Samir S. et al. Microprogramming Principles and Practices, FIGS. 2-3, Prentice Hall, Englewood Cliffs, N.Y., 1970.
6. Feed rate setting unit 12: Cf. Zusman V. T. et al. Multicoordinate Digital Control Unit of Linear Speed, U.S.S.R. Author's Certificate No. 209,566, Bulletin for Inventions, No. 5, 1968.
7. Program input unit 14, program input control unit 15 and control desk 17:

All these units are similar to those used in the IBM system 360 produced by the IBM Corporation (USA).

8. Pulse shaping unit 32: Cf. Step Motor System, Automation, September, 1960.
9. Address register 130 and operation code register 131: Cf. Alekseev et al., Digital Circuits of Current's Distribution, Publishing House "Energy", Leningrad, 1969, pp. 35–39.
10. Operation code decoder 132: Cf. Alekseev et al., Digital Circuits of Current's Distribution, Publishing House "Energy", Leningrad, 1969, pp. 53–54.
11. Command code modification circuit: Cf. Computer Handbook, edited by H. D. Huskey et al. pp. 15–6, 15–7, McGraw-Hill Book, 1962.

What is claimed is:

1. A device for numerical programmed control of relative movement of a tool and a workpiece along an outline in an industrial plant equipped with an automatic processing machine-tool, comprising: a control desk; an automatic control unit having inputs and outputs; a program input control unit connected to said control desk and to said automatic control unit and having an output; a program input unit connected to said program input control unit, a feed rate setting unit connected to said control desk and having an output, a pulse shaping unit for the shaping of pulses corresponding to elementary movements, said pulse shaping unit being connected to said automatic control unit, to said processing automatic machine-tool, and to said feed rate setting unit, reversible address decoders having address write inputs, reversible current pulse shapers, reproduction amplifiers, switching keys for the switching of output signals of the reproduction amplifiers, regeneration registers, operating registers, a buffer storage and a computer; said operating registers, buffer storage and computer forming a common magnetic matrix storage including common digit buses and three groups of address buses; two fo said groups of the address buses of said matrix storage corresponding to said buffer storage and to said operating registers, said third group of the address buses corresponding to said computer and being, via said reversible current pulse shapers, connected to said outputs of said automatic control unit corresponding to the readout of said reversible address decoders and reversible current pulse shapers; said write inputs of said reversible address decoder of the buffer storage being connected to said outputs of said automatic control unit and program input control unit respectively, said write address inputs of said reversible address decoder of the operating registers being connected to said outputs of said automatic control unit; said common digit buses of said matrix storage being connected, via said reproduction amplifiers and switching keys of output signals of the reproduction amplifiers, to said regeneration register, automatic control unit, feed rate setting unit and processing machine-tool; and a multiprogram operation unit including inputs corresponding to interrogations for performing one of the programs and outputs corresponding to the beginning of one of the programs; there being connected to said inputs corresponding to the interrogations for performing one of the program an output of said program input control unit, an output of said feed rate setting unit and outputs of said automatic control unit, there being connected to said start input of said multiprogram operation unit an output of said automatic control unit, a signal indicating the availability of said computer for executing the next program appearing at said output of said automatic control unit, said outputs of said multiprogram operation unit corresponding to the beginning of one of the programs being connected to the start inputs of said automatic control unit.

2. A device as claimed in claim 1 wherein said multiprogram operation unit comprises magnetic keys which combine the functions of storage registers and a decoder, said keys including two-position magnetic keys and a three-position magnetic key, having respectively first write, read, clear regeneration windings and second write, read, and regeneration windings; regeneration cores including write windings and read windings; a current pulse shaping unit including write windings;

a magnetodiode circuit, said windings of said two-position magnetic keys being embodied in said magnetodiode decoder circuit and being connected to said write windings of said regeneration cores; said second read windings of said three-position magnetic key being connected to said write windings of selected said regeneration cores of the three-position magnetic key; read circuits for selected of said regeneration cores of said two-position magnetic keys and said three-position magnetic key including said write windings of said current pulse shaping unit, said first clear windings of said two-position magnetic keys and said regeneration windings of said two-position and three-position magnetic keys.

* * * * *